United States Patent
Kanevsky et al.

(10) Patent No.: US 6,401,065 B1
(45) Date of Patent: Jun. 4, 2002

(54) INTELLIGENT KEYBOARD INTERFACE WITH USE OF HUMAN LANGUAGE PROCESSING

(75) Inventors: Dimitri Kanevsky, Ossining, NY (US); Stephane Maes, Danbury, CT (US); Clifford A. Pickover; Alexander Zlatsin, both of Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,345

(22) Filed: Jun. 17, 1999

(51) Int. Cl.[7] .......................... G10L 15/14; G10L 15/22
(52) U.S. Cl. ........................ 704/256; 704/275
(58) Field of Search ................ 704/231, 251, 704/254, 255, 256, 257, 270, 275; 382/116

(56) References Cited

U.S. PATENT DOCUMENTS

| | | | |
|---|---|---|---|
| 5,180,029 A | | 1/1993 | Kim |
| 5,588,105 A | * | 12/1996 | Foster et al. ............... 345/779 |
| 5,608,624 A | * | 3/1997 | Luciw ............................ 704/9 |
| 5,621,809 A | * | 4/1997 | Bellegarda et al. ......... 704/251 |
| 5,761,329 A | * | 6/1998 | Chen et al. .................. 382/116 |
| 5,839,104 A | * | 11/1998 | Miller et al. ................ 704/251 |
| 5,937,380 A | * | 8/1999 | Segan ......................... 704/235 |
| 6,054,990 A | * | 4/2000 | Tran ............................ 345/358 |
| 6,219,639 B1 | * | 4/2001 | Bakis et al. ................. 704/246 |
| 6,246,985 B1 | * | 6/2001 | Kanevsky et al. .......... 704/270 |

* cited by examiner

*Primary Examiner*—Marsha D. Banks-Harold
*Assistant Examiner*—Martin Lerner
(74) *Attorney, Agent, or Firm*—Scully, Scott, Murphy & Presser; Daniel P. Morris, Esq.

(57) ABSTRACT

An intelligent use-friendly keyboard interface that is easily adaptable for wide variety of functions and features, and also adaptable to reduced size portable computers. Speech recognition and semantic processing for controlling and interpreting multiple symbols are used in conjunction with programmable switches with embedded LCD displays. Hidden Markov models are employed to interpret a combination of voice and keyboard input.

23 Claims, 6 Drawing Sheets

INTELLIGENT KEYBOARD INTERFACE WITH USE OF HUMAN LANGUAGE PROCESSING

TECHNICAL FIELD OF THE INVENTION

The present invention relates to computer keyboard technology and more particularly to an intelligent keyboard interface having human language processing capabilities.

BACKGROUND OF THE INVENTION

A typical computer keyboard includes alphanumeric and function code key pads which are labeled to indicate the functionality of each key. Typically, an application such as a word processor, spread sheet program, and/or mosaics, maps a function provided by that application to a key such that when a user presses the key, that function is initiated by the application. However, because most applications in use at present provide numerous functionalities which exceed the number of keys available on the existing keyboard, those applications typically designate different functionalities by combining the key sequences. The user must then memorize all the key sequences and/or have to refer back to the manual.

The most common solution employed so far is the use of templates which are placed on top of the keyboard, on which are printed the description of the functions. However this solution, although inexpensive, is limited in its usefulness since these templates obviously cannot represent all the necessary possible multiple function keys for the many applications described herein that are now commonly used. Another existing solution using electronic templates is described in U.S. Pat. No. 5,181,029 issued on Jan. 19, 1993 to Jason S. Kim and entitled "Electronic Keyboard Template". However, the electronic templates not only require an increase in the size of the keyboard, but also are restricted to the representation of the meaning of the keys located in the upper part of the keyboard. For example, the electronic templates do not allow explanation for all the keys of the keyboard, for instance, editing in an emacs document editor.

Yet another solution has been to use pop-up menus and/or icons in place of multiple key functions. This solution however, is extremely cumbersome and inconvenient because a user must frequently switch between the keyboard and a mouse or a digitizer in order to operate the pop-up menus. Moreover, the use of pop-up menus and icons creates a major disadvantage by occupying a large portion of the space on a screen or a display terminal and severely restricting, the available space required to display other more important information such as texts being edited and images further requiring a user to constantly switch between various shells and icons, which is extremely cumbersome and inconvenient.

Accordingly, the presently available devices do not provide feasible solutions to the ever-shrinking size of computers and current trends towards portable equipment such as laptops and notebooks, which do not leave sufficient space for both a screen and key board. Therefore, it is highly desirable to provide a more flexible mechanism for enabling different designations or assignment of functions on the keyboard at different times according to the functionality being employed without the problems associated with the presently available techniques described hereinabove.

SUMMARY OF THE INVENTION

The present invention is directed to a novel intelligent keyboard which employs automatic speech recognition (ASR) and semantic language processor (SLP) techniques to provide a user friendly interface for various keyboard uses. The intelligent keyboard of the present invention having an ASR module will enable the individual keypads on the keyboard to display their labels in international languages. For example, the keyboard will include a capability to recognize speech such as "get Russian alphabet" and respond by displaying Russian characters on the key pad. An instruction from a user such as "go back to English" will drive the keyboard to display the English characters again.

Furthermore, the displays need not be limited to a different set of languages being displayed at different times. A different set of fonts and/or styles in the same language may be displayed according to a user's instructions. For instance, a user may instruct the intelligent keyboard of the present invention to display cursive style. The cursive style will then appear as labels on each keypad.

Further yet, with the intelligent keyboard of the present invention, a user may request different applications by voice. For example, the user may vocalize "activate Internet access", and in response, the intelligent keyboard of the present invention may display symbols on the keys which are used for accessing various Internet functions, including e-mail lists, calls to specific customers, and the like.

Additionally, a user may activate a different application such as a word processor or a spread sheet program and direct the keyboard to display function key labels corresponding to the application by enunciating "activate Word Perfect." The Intelligent keyboard of the present invention then responds by displaying the function key labels used in Word Perfect word processor application. ASR also may be employed to display different icon images used with applications such as the database applications directly on the key pads.

In yet another embodiment of the present invention, the keyboard keypad set may be transformed into a telephone dial pad when the computer and telephone are integrated. For example, user may specify "telephone" to display a telephone dialer on the keypad. With such capabilities, a user may directly dial a phone number or access any phone number previously stored. The display feature may also include conference call function key labels.

When a user needs to correct the errors from the speech recognizer, the user will have the set of alternative options displayed directly on the keys of the keyboard. The user can easily select the correct option/word, by either pressing the corresponding key, or pronouncing the number of the line where the correct word is displayed. This solution is especially advantageous with reduced size laptops, and particularly with Personal Digital Assistants where the small screens cannot represent simultaneously a speech recognition output and a window with alternative words.

Yet further, the present invention combines a use of SLP with an intelligent keyboard to enable interpretation and processing of multiple key function actions. For example, in applications where one or more keys display different icons, the meaning of a particular icon may depend on other icons that are activated via the respective key buttons at the same time. If an icon represents the picture of a telephone, and other icons represent the list, home, e-mail, or personal computer pictures, then pressing only one single key for example, the icon representing the telephone, may activate a telephone dialer and related functionality. Simultaneously pressing two keys with two icons, e.g., telephone and list, causes the display of the complete list of telephone numbers. Pressing the keys displaying the icons telephone and e-mail, e.g., causes the display of the list of all e-mail addresses. Pressing the keys displaying the icons telephone and home activates the call to the user's home, for example, via usual telephone. Pressing the keys with labels such as telephone, home, or personal computer (PC) subsequently connects the user subnotebook remotely with his home PC, via a telephone line. In sum, pressing the icon representing the telephone is interpreted by SLP of the present invention as a specific adjective or verb depending on the other keys, which are pressed simultaneously.

The present invention also enables combined use of ASR and SLP which allows the user optionally to either speak the commands, or enter the command by pressing multiple keys, or use the two options simultaneously. An example where the two options may be used simultaneously is in a situation in which a user enunciates the word "save" while pressing a key that represents a file that should be saved. Such use makes saving files with long names especially convenient. Another application for the combined use of ASR and SLP with an intelligent keyboard according to the present invent on may be video games where complex user interaction is required quickly. In these cases SLP solves the complex task of recognizing the meaning of the user's combined voice-keyboard actions, i.e., whether the voice input should be displayed on a screen, e.g., typing a text, or activated on a keyboard, e.g., as an icon, or interpreted as an action, e.g., "call home".

The intelligent keyboard interface of the present invention may be used with various devices including workstations, desktops, laptops, notebooks, palmtops, webphones, digital cameras, TVs and recorder controllers.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DESCRIPTION OF THE PREFERRED
EMBODIMENT OF THE INVENTION

Figure 1:
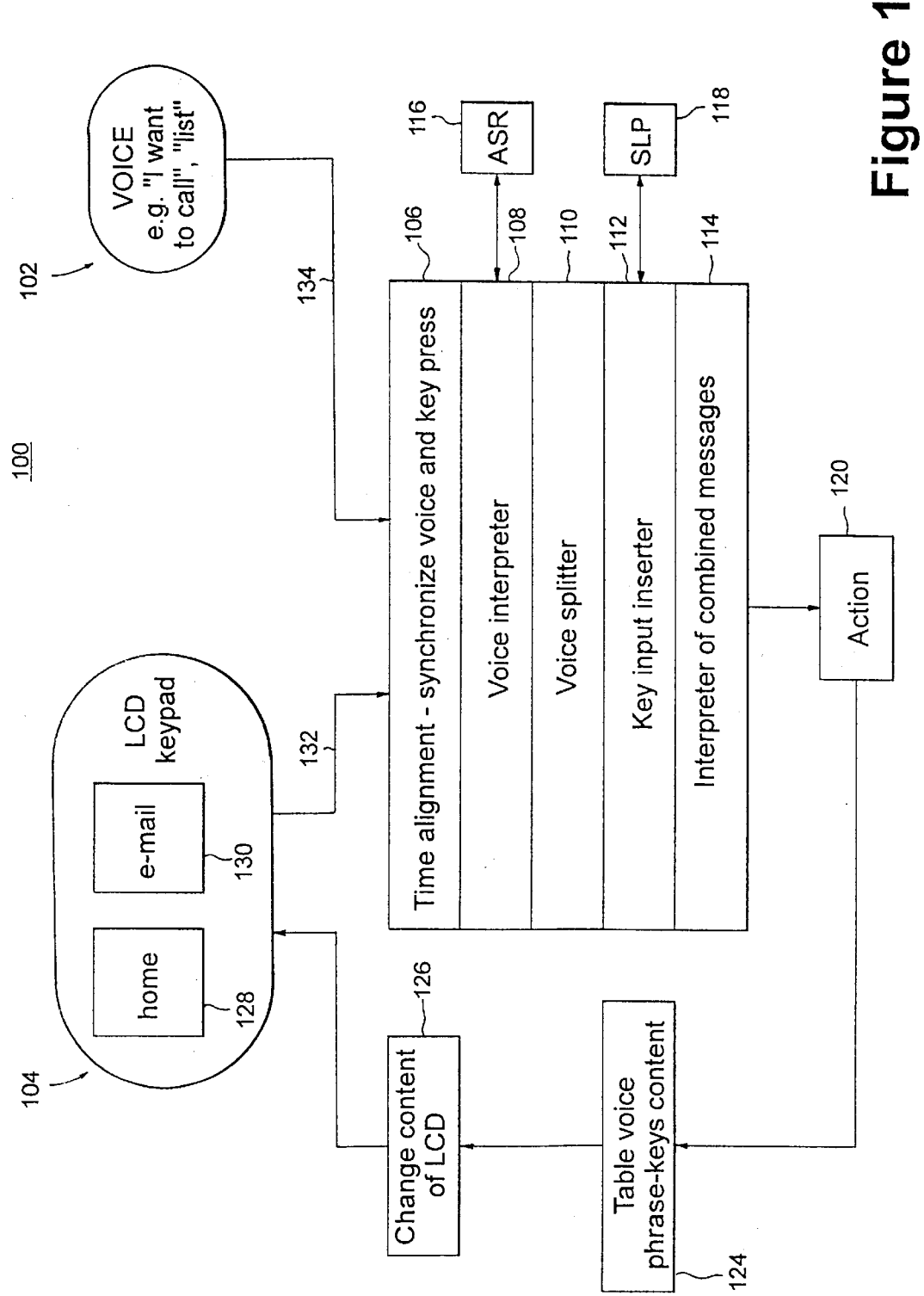
FIG. 1 illustrates the components of the present invention which may be integrated with a computer system.

The components of the device of the present invention generally reside within a computer system having a central processing unit or an equivalent thereto, including a workstation, desktop, laptop, notebook, or palmtop. FIG. 1 illustrates the components of the intelligent program module 100 of the present invention, which may be integrated with such computer systems. The system of the present invention can receive voice inputs and keypad inputs, either alone or in combination as shown by arrows 134 and 132 respectively. The keyset 104 may be a mounted programmable keyset having embedded LCD displays 128, 130. Voice input may include enunciated speech such as "I want to call" as shown at 102. When the inputs are received by the intelligent program module 100 of the present invention, a synchronize module 106 synchronizes the voice and keypad input to determine whether the combination of the two inputs are meant to be interpreted together. The inputs are synchronized and determined to be related by measuring the time interval between the two inputs 132, 134. For example, if a time interval between the enunciation of the words, "I want to call"102 and the activation of key stroke "home"128 is within a short predetermined time period, the inputs are determined to be related and therefore are interpreted together as being "I want to call home".

Figure 4:
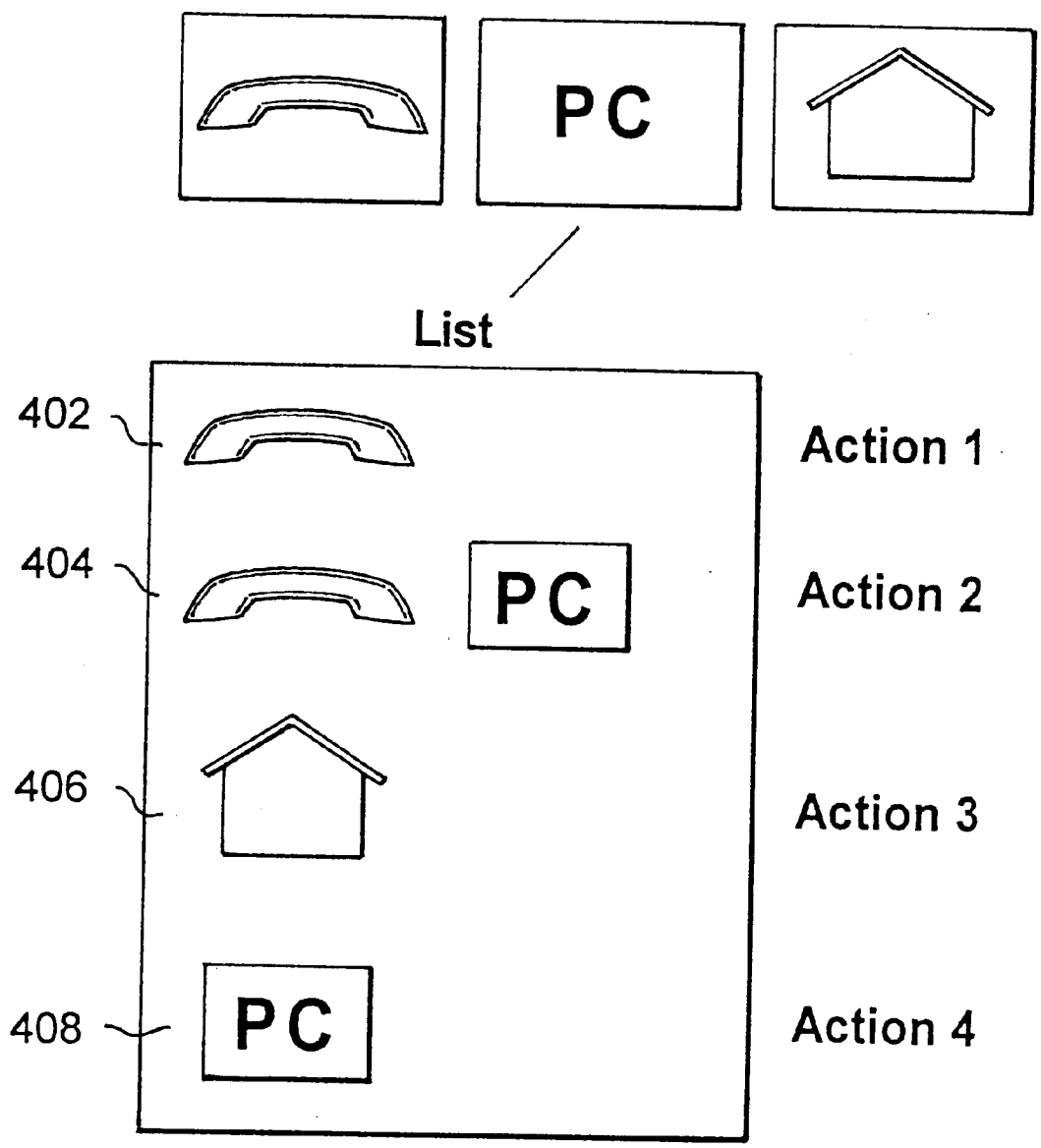
FIG. 4 is illustrates an example of voice splitter functionality of the present invention.

The voice input 102 then passes to a voice interpreter 108, which activates an automatic speech recognition (ASR) module 116. Generally, the automatic speech recognition (ASR) module receives a voice input from the user, processes it to ascertain the meaning of the words. ASR module may use any available ASR technique, which is generally known in the field of automatic speech recognition processing. The interpreted voice input is then processed again by voice splitter 110 if needed. The functions of a voice splitter 110 module in FIG. 1 will now be described with reference to FIG. 4. The voice splitter 110 module generally groups the interpreted voice input into separable actions. For example, if a voice input "phone PC" was received, the voice splitter 110 (FIG. 1) determines that the two words designate a single action 404, e.g., displaying phone number pad on PC so that the PC may be used as a telephone. In another example, if a voice input "phone home" was received, the voice splitter 110 (FIG. 1) would split the input into two actions, action 1 phone 402 and action 3 home 406.

Referring back to FIG. 1, the key input inserter 112 combines the voice and keypad input into one phrase which is then interpreted by an interpreter 114 activating a semantic language processing (SLP) module 118. A semantic language processing (SLP) module 118 of the present invention interprets a phrase formed from the voice input 102 via the ASR module 116 and keyboard input 104. According to the SLP 118 interpretation, an action 120 is activated. For example, if a voice input "list" 102 was received with keypad "e-mail" 130, the action to be activated is determined to be listing e-mail addresses. At 124, table mapping, e.g., by table lookup, is performed to determine which e-mail addresses should be listed for this particular user. Then at 126, the contents of LCD keyboard displays are changed to reflect the e-mail addresses, which are then shown on the LCD keyboard 104. Thus, contents of keyboard LCD displays would change to new symbols and configurations depending on the ASR module 116 and SLP module 118 interpretation of the inputs 102, 104.

As a result of voice 134 and/or keypad input 132, an action may either produce a display on a display monitor or on a display device such as a liquid crystal display (LCD) 128, 130 embedded in the keyset. The keyset includes the ability to display varying symbols including pictures, letters, words, and/or icons on its keys. The value of the symbols on each key at each time depends on the user's actions expressed by voice and/or finger manipulations.

Figure 3:
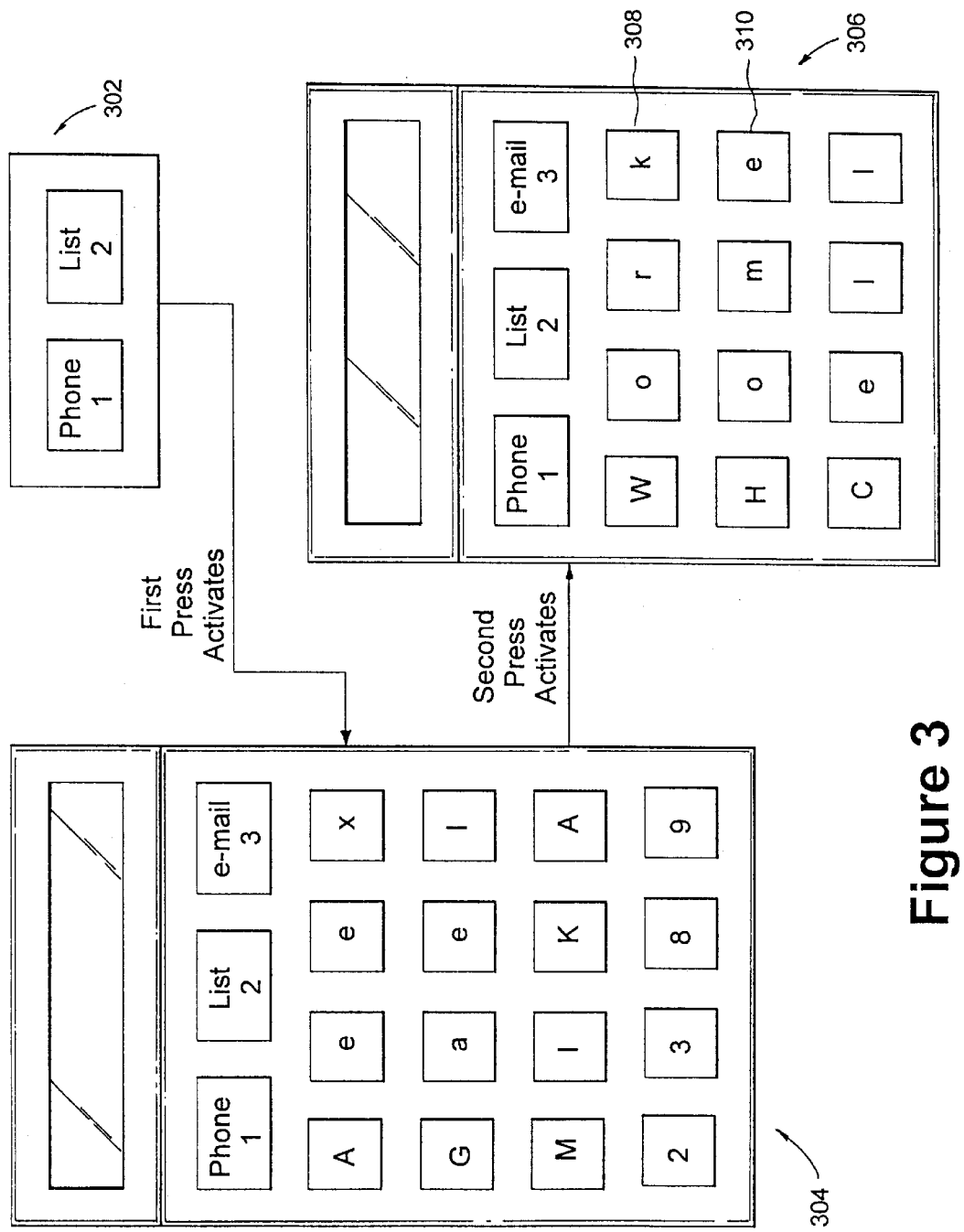
FIG. 3 is an example of an intelligent keyboard of the present invention which switches its LCD displays based on the user voice and key input.

FIG. 3 illustrates the intelligent keyboard of the present invention which changes its displays based on a user input. When a phone list keypad 302 is pressed, the keyboard contents 304 would change to display words relating to the keypad pressed as shown at 306. For example, if the keypad which includes an LCD display of phone and list icon 302 is pressed, the portions of keyboard LCD displays would list "w","o","r","k" 308 forming the word "work", and "h", "o ","m","e" 310, forming the word "home", etc. When any of the keys "w","o","r","k" are pressed, the keyboard LCD displays 306 would change to actual phone number associated with user's work place. The changing of LCD displays on the keyset may be achieved by transmitting signals to the LCD display control device to change its display content and is well known to the persons skilled in the art.

Figure 2:
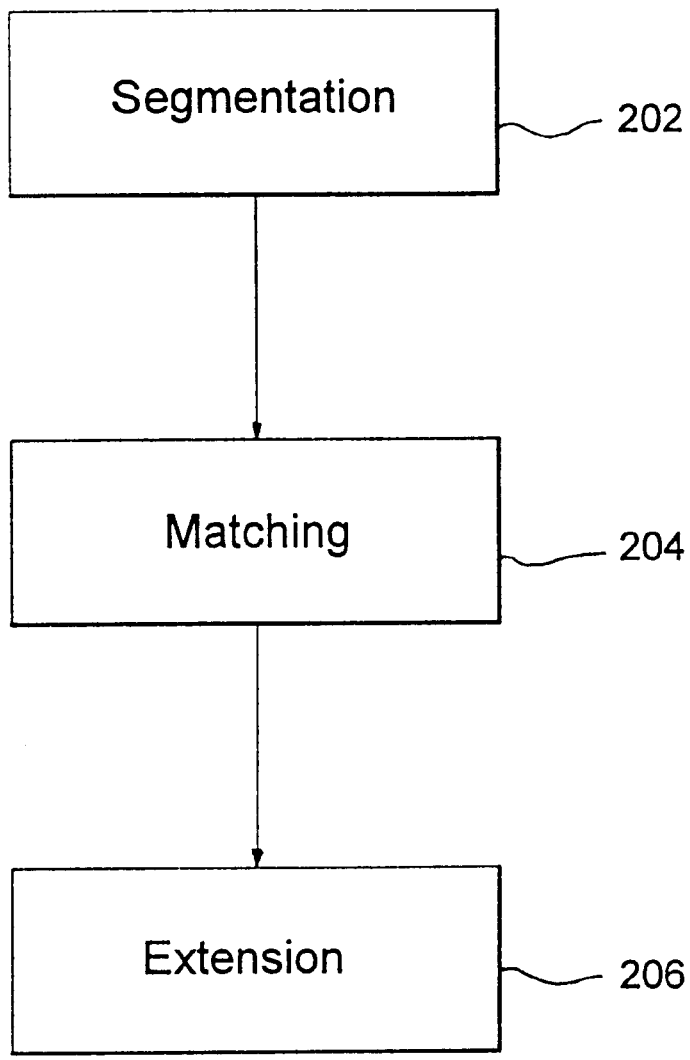
FIG. 2 is a flow diagram illustrating an input processing algorithm of the present invention.

FIG. 2 is a flow diagram illustrating an input processing algorithm of the present invention. In the preferred embodiment of the present invention, keyboard input without any additional speech input is interpreted in inter-related steps which include segmentation 202, matching 204, and extension 206. These steps 202, 204, 206 may be performed, for example, in the synchronize module 106 shown FIG. 1. In the segmentation step 202, the sequence of key actions that represents one "continuous segment" is detected by timing a delay between subsequent keys that were pressed. This time delay is usually very small and may be preset. The longest sequence of keys that satisfies time delay requirements between the key strokes, referred to as a "continuous segment" is considered as a possible command phrase.

In a matching step 204, the sequence of entered symbols is matched against a predefined set of stored pairs which relate a key sequence with a command. The longest "continuous segment" that matches some command from this set of pairs will be interpreted as the command that corresponds to the entered sequence of symbols.

In an extension step 206, if the given sequence of keys that represents the continuous segment does not match any command, then the next continuous segment is added to the current one and both these subsequent segments are matched to a command phrase. That is, segmented phrases are concatenated or appended in an attempt to form a matching command. This process continues until the command phrase is found or the limit of length for sequences of keys is reached.

In the preferred embodiment of the present invention, the voice input without keyboard input is interpreted using conventional automatic speech recognition techniques known to persons skilled in the art. The keyboard then displays a set of commands that a user entered via voice. This allows for an increase in the number of commands that the user can use without memorizing the specific key code sequences. Since automatic speech recognition may also be used for purpose other than to change a keyboard display, the present invention includes a method for determining whether a voice input should be interpreted as a command. For example, a voice input may be interpreted as a command if the words in the voice input are semantically relevant to some command phrases, which are specified by symbols that are currently displayed on the keyboard. For instance, if keys on the keyboard display symbols telephone, list and e-mail, and the user enunciates a phrase, "Show me e-mail notebook", SLP of the present invention interprets the phrase as a command and not as input that should be typed in a file.

The method and system of present invention interprets combined voice and keyboard input in a series of steps including segmentation 202, matching 204, and extension 206 as described hereinabove. A voice input which is decoded according to a known ASR technique and a keyboard-activated sequence of symbols is considered in the present invention as related if a time interval between the enunciation of the words and the activation of key strokes is within a short predetermined time period. Then, if this sequence matches a predefined pair, e.g., "decoded class phrase"+key symbol sequence–command pair, the relevant command is executed. Here the "decoded class phrase" denotes a semantic class of the decoded phrase, e.g., "show a picture of a dog", "display a picture of a dog", "show a dog" are in the same semantic class.

In an extension step, the sequence of key-entered symbols is extended as described hereinabove. If a combined decoded phrase-keyboard input cannot be extended to match a command, then the decoded input is directed to a monitor or an output file where the user's dictation is stored and only the keyboard's sequence of symbols is processed as a command. Other variations of segmentation, matching and extension are available.

After a voice-keyboard input is sent to SLP, the configuration of symbols on the keyboard is changed and the user can enter new voice-keyboard input in accordance with the new configurations of symbols. For example, the user can say: "Show me . . . " and then press the key [switch] that displays the symbol "(Customers in NY". The keyboard would display the list of customers in NY and a keyset for new possible actions, e.g., "orders", "profile", "calls", "cancel" and "addresses". The user can speak the words, "What is order of" and press the key that corresponds to a particular customer.

The present invention provides a predefined set of pairs for the key sequences and commands, and also for the voice input phrases+key sequences and commands. User-friendliness of an interface largely depends on how multiple key actions are matched with commands. In the present invention, a set of pairs has the following grammatical structure: A={(sequence of symbols, command)}. The set A is indexed by sequences of classes, which may include parts of speech. Each symbol from A can belong to several different classes, for example a symbol TELEPHONE can correspond to any of three parts of speech-noun (e.g. "hang TELEPHONE"), adjective (e.g. "TELEPHONE list") or verb ("CALL"). The sequence of symbols defines a sequence of classes (e.g., "SAVE TELEPHONE LIST" defines a sequence "VERB ADJECTIVE NOUN").

For example, let set C denote a set of allowed sequences of classes. For example, "NOUN NOUN" is not allowed, but "ADJECTIVE NOUN" or "VERB NOUN" is allowed. The sequence of symbols will be called admissible if it defines the unique sequence of classes from C. If the sequence of symbols is admissible it can be mapped to a formal expression in a formal language and further actions can be processed. For example, let the symbol LIST correspond only to the class "NOUN". Then the sequence "TELEPHONE LIST" can only correspond to two classes, i.e., "ADJECTIVE NOUN"—telephone list, or "VERB NOUN" call list. In the present invention, by employing the above described syntax, if there is no third key symbol specified, the computer would then display by default a telephone list of numbers. Otherwise if there are two more symbols entered, e.g., "PC" and "HUMAN LANGUAGE TECHNOLOGIES", one can get the unique allowed sequence "VERB ADJECTIVE NOUN ADJECTIVE NOUN" that corresponds to the action: "send a note via e-mail to all members of the Human Language Technologies department" ('send' 'electronic' 'note' 'HLT' 'department').

The construction of the admissible set C is provided with help of semantic and grammar tools. The statistical analysis and classification of typical user actions is also possible.

In situations where a whole word is a mixture of two modality inputs, for example, a voice input and a key input the present invention employs Hidden Markov models (HMM) to convert the input into an appropriate string of commands which signals an action. A label of a document or an item may include both phonemes and numbers, and some examples of the combined input were described hereinabove. A telephone number is such an example. Another example may be a document name such as "doc01." In these instances it is expected that a user may enunciate the phoneme and type in the rest of the numbers on the keyboard to convey a document name for further processing. In the preferred embodiment the present invention interprets these combined inputs by employing several different approaches of Hidden Markov model (HMM) structures.

In the first approach Hidden Markov models can include as output both type of labels, i.e., voice and key inputs. In this approach overlapped voice and key labeled segments are separated and the likelihood of each alternative is computed.

In the second approach the Hidden Markov model (HMM) is a hybrid of two types of HMM: one to process voice labels and another to process key labels. These two types of HMM are connected with arcs that allow a path to switch between the two types of HMMs. In this approach overlapped voice key labeled segments have two time scales. The first time scale is used to process voice labeled segments and the second time scale is used to process key labeled segments. The two different time scales are switched back and forth at the same time when two types of HMM are switched. In both first and second approaches probabilities for key labels are estimated using the criteria that keys may be mistyped or dropped when words are typed especially when key input is combined with voice input. Moreover, users often mistype words by typing a nearby key instead, e.g., "IBN" instead "IBM", or omit typing letters in a word, e.g., "CAL" instead of "Call". In other instances, users may type abbreviated versions of words, e.g., "u" instead of "you". Furthermore, instead of typing, a user may speak as described above.

Figure 5:
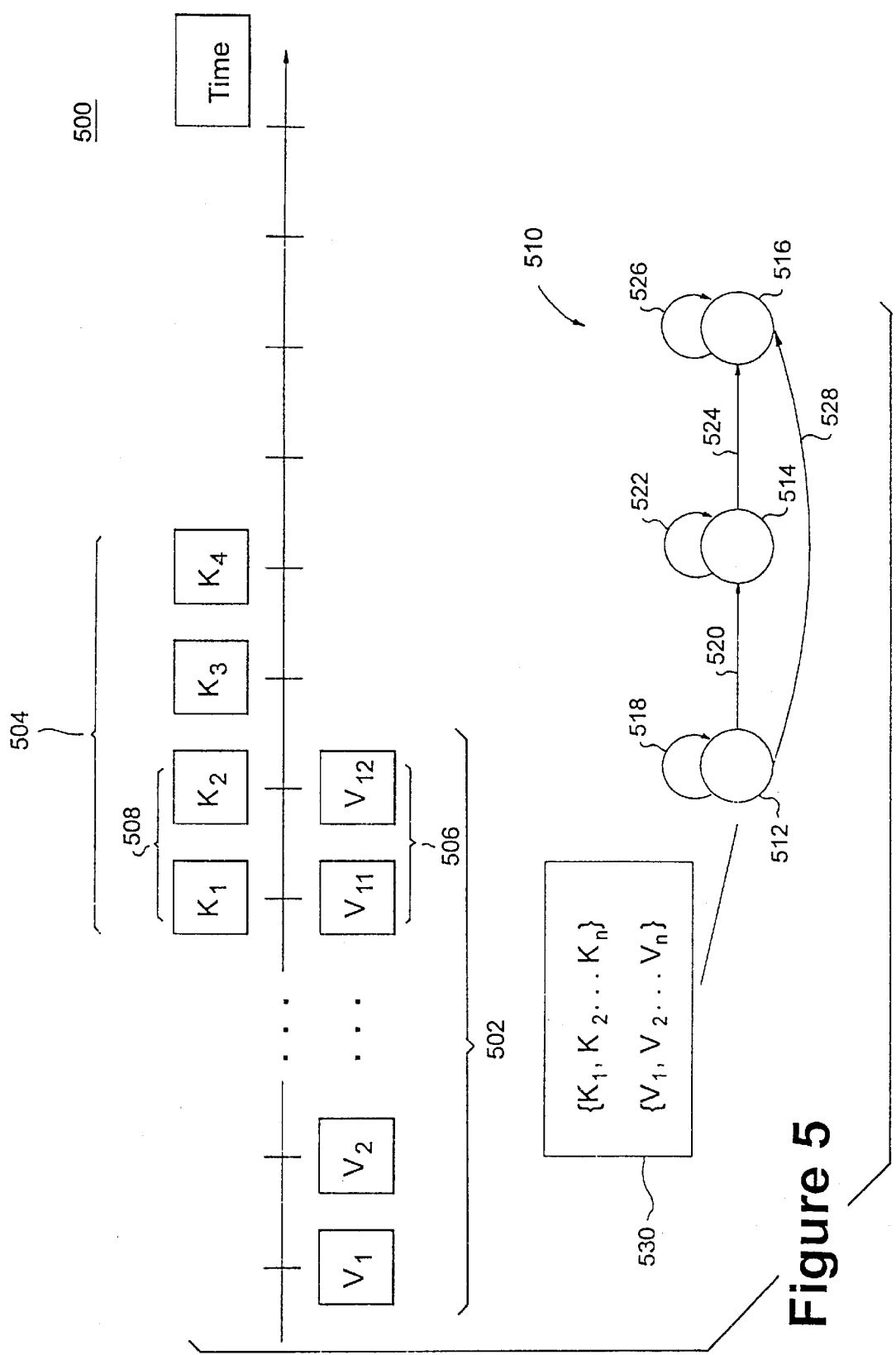
FIG. 5 is an example of a Hidden Markov model (HMM) employed in the present invention.
Figure 6:
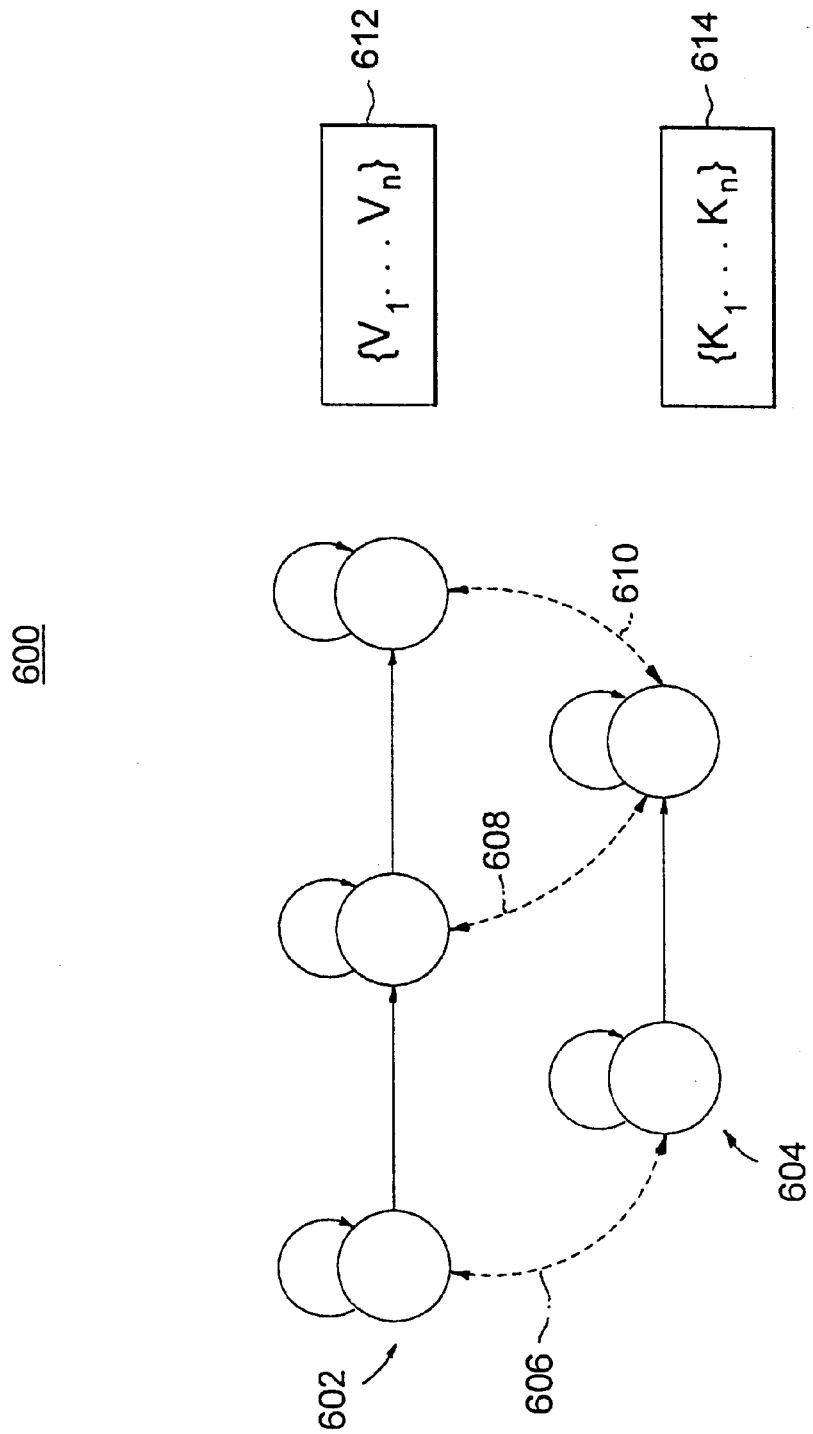
FIG. 6 is another example of a hybrid HMM where the voice and key inputs are processed as two types of HMM.

FIGS. 5 and 6 are state diagrams illustrating the multimodal approaches described hereinabove for recognizing the input that includes voice and/or key input. In the present invention Hidden Markov model (HMM) output labels may include voice and keys for multimodal approach. Every HMM represents a word in a vocabulary and HMM is used to compute a likelihood of any given string of labels. This string of labels represents a user voice and key input. Some of the voice and key inputs may overlap in time, i.e., the user may speak and type simultaneously within a given time interval. A probability of an occurrence of a string having voice and key labels may be computed for each HMM in a vocabulary using a known standard method. For a given string of voice/key labels and each HMM corresponding to a word, a likelihood score for a particular string outcome may be computed by multiplying the probability of the HMM corresponding to a word. The decoding word is the word that corresponds to the HMM with the highest likelihood score.

In FIG. 5, a time line 500 is shown in which a voice and key are input where some of voice and key input overlap in time. In such a situation where voice and key labels are overlapped several possible strings are considered in which key and voice labels are separated. For example, consider an input as shown in FIG. 5 which includes voice string v1, v2, . . . , v10, v11, v12 502 and a key string k1, k2, k3, k4 504 where v11, v12, 506 and k1, k2 508 overlap in time.

Consider also in this example that the voice input includes three segments v1, v2, . . . , v12; v1, v2, . . . ,v10; and v11, v12. Further consider that the sequence of keys k1, k2, k3, k4 corresponds to a word in a vocabulary and that no sub-segment in this string corresponds to any word). Then the strings for which scores of HMM are computed are: v1, v2, . . . . v11, v12, k1, k2, k3, k4; and v1, v2, . . . ,v10, k1, k2, k3, k4, v11, v12. The string that has the highest likelihood score for some sequence of words in the vocabulary is put into a decoding stack. After several decoding paths are out into stack the best decoding path is chosen using standard methods.

FIG. 5 also illustrates an example of a Hidden Markov model 510 with states 512, 514, 516 and output arcs 518, 520, 522, 524, 526 where the arcs 518, 522, and 526 are loops. Each arc has output labels: key data {k1, k2, . . . } and voice data {v1, v2, . . . } 530. A likelihood for one path is computed as a product of probabilities of an outcome including a voice or key label from one of the above strings produced by an arc j.

FIG. 6 is another example of a hybrid HMM where the voice and key inputs are processed as two types of HMM. In FIG. 6, two HMMs 602 604 are connected via dotted arrows 606 608 610. The first HMM 602 models strings that include voice labels. For example the output labels in the first HMM 602 are voice labels v1, v2, vn 612. The second HMM 604 models strings that include key input labels, k1, k2, . . . kn 614. When a path travels through the solid arrows in 602 or 604, labels are produced. When a path travels through the dotted lines, i.e., path is switched between the first and second HHMs, no labels are produced. If there are overlapped strings of voice and key labels then the voice and key parts of the strings that are overlapped are processed only when arcs are in the HMMs that correspond to the respective label types, i.e., voice or key.

For example, consider the following voice string v1, v2, . . . , v10, v11, v12 and a key string k1, k2, k3, k4 where v11, v12 and k1, k2 overlap in time. When the voice string path is traversed only arcs in the first HMM 602 are processed. When the path encounters and processes time frames that have overlapped parts v11, v12 and k1, k2, the path may either stay in the first HMM 602 or jump to the second HMM 604 for key input parts. If the path stays in the first HMM 602, the voice label output continues. If the path jumps to the second HMM 602, the output of key label is produced. The path can at any time return to the original HMM, i.e., in this example the first HMM 602 and continue to output voice labels, continuing to produce voice output from where it stopped before switching to the second HMM 604.

There may be different [path] paths corresponding to different jumps between the first HMM 602 and second HMM 604. Each path has a different likelihood [scores] score. The path that produces the highest likelihood score is considered as the most probable path and the likelihood score of this path is compared with other most probable likelihood scores for paths for different hybrids of HMMs for different words or classes of words. This hybrid HMM can be described as a typical HMM with arcs that have zero or empty output labels when traversing between the HMMs. Thus, a general theory of computation of likelihoods and paths [are] is applicable and further there can be different ways to produce topologies of how states are connected, as described in the general theory.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. An intelligent keyboard interface having human language processing capability which is responsive to commands designated by voice input and keyboard input to change keypad displays on a keyboard, the intelligent keyboard interface comprising:

an intelligent module automatically responsive to a combination of voice input and keystroke input to recognize and interpret the combination into command signals via a Hidden Markov model (HMM), the HMM comprising:

a first Hidden Markov model including one or more first states having one or more first arcs for connecting the one or more first states, the one or more first arcs representing output string of voice;

a second Hidden Markov model including one or more second states having one or more second arcs for connecting the one or more second states, the one or more second arcs representing output string of keys;

one of more third arcs connecting the one or more first states with the one or more second states, the one or more third arcs producing an empty output string, the one or more third arcs traversed when an interpretation state between the output string of the voice and the output string of keys are switched; and one or more display screens embedded in one or more keypads on a keyboard capable of displacing contents responsive to the command signals transmitted from the intelligent module, wherein the displayed contents represent user selectable functionality for performing functions associated with the combination of the voice input and keyboard input.

2. The intelligent keyboard interface as claimed in claim 1, wherein the contents include symbolic icons.

3. The intelligent keyboard interface as claimed in claim 1, wherein the contents include alphanumeric text.

4. The intelligent keyboard interface as claimed in claim 1, wherein the intelligent module includes an automatic speech recognition module for interpreting voice input.

5. The intelligent keyboard interface as claimed in claim 4, wherein the intelligent module further includes a semantic language processing module for interpreting combination of voice input and keyboard input.

6. The intelligent keyboard interface as claimed in claim 5, wherein the intelligent module further includes a synchronization module for synchronizing inputs forming a command.

7. The intelligent keyboard interface as claimed in claim 6, wherein the synchronization module is enabled to synchronize temporally overlapping inputs forming a command in accordance with time intervals in which the inputs of overlap.

8. The intelligent keyboard interface as claimed in claim 1, wherein the voice input is a phoneme.

9. A method for automatically changing contents of display device integrated onto a keyboard including a plurality of keypads, the method comprising:

grouping one or more inputs into a first continuous segment representing a command phrase, said one or more inputs including a combination of voice input and keyboard input that are recognized and interpreted into the command phrase via a Hidden Markov model (HMM), the HMM comprising:

first Hidden Markov model including one or more first states having one or more first arcs for connecting the one or more first states, the one or more first arcs representing output string of voice;

a second Hidden Markov model including one or more second states having one or more second arcs for connecting the one or more second states, the one or more second arcs representing output string of keys;

one or more third arcs connecting the one or more first states with the one or more second states, the one or more third arcs producing an empty output string, the one or more third arcs traversed when an interpretation state between the output string of the voice and the output string of keys are switched; and;

comparing the first continuous segment with a prestored key sequence-command pairs to determine an action which matches the command phrase designating contents to display, wherein the displayed contents represent user selectable functionality for performing functions associated with the command phrase.

10. The method for automatically changing contents of display device integrated onto a keyboard including a plurality of keypads as claimed in claim 9, the method further comprising:

appending a second continuous segment accepted as input to the first continuous segment, if no match is found in the step of comparing.

11. The method for automatically changing contents of display device integrated onto a keyboard including a plurality of keypads as claimed in claim 10, the method further comprising:

repeating he steps of appending and matching until a match is found.

12. The method for automatically changing contents of display device integrated onto a keyboard including a plurality of keypads as claimed in claim 10, the method further comprising:

repeating the steps of appending and matching until a match is found or a number of appended segments exceed a predetermined number.

13. The method for automatically changing contents of keyboard display as claimed in claim 9, wherein the step of grouping further includes determining which one or more inputs are associated with each other based on a predetermined time interval occurring between each input.

14. The method for interpreting input to automatically change contents of keyboard display as claimed in claim 9, wherein said one or more input includes one or more keystroke input.

15. The method for automatically changing contents of keyboard display as claimed in claim 9, wherein said one or more input includes a combination of voice and one or more keystroke inputs.

16. The method for automatically changing contents of keyboard display as claimed in claim 15, wherein if the voice and keystroke inputs temporally overlap, the step of grouping further includes synchronizing the temporally overlapping inputs for representing the command phrase in accordance with time intervals in which the inputs overlap.

17. The method for automatically changing contents of keyboard display as claimed in claim 9, wherein the method further includes:

changing display contents of keyboard display based on the action matching the command phrase.

18. The method for automatically changing contents of keyboard display as claimed in claim 9, wherein the method further includes:

interpreting the first continuous segment employing semantic language processor before the step of comparing.

19. The method for automatically changing contents of keyboard display as claimed in claim 9, wherein the method further includes:

interpreting the first continuous segment employing automatic speech recognition processor before the step of comparing.

20. The method for automatically changing contents of display device integrated onto a keyboard including a plurality of keypads as claimed in claim 9, wherein the voice input is a phoneme.

21. A program storage device readable by machine, tangibly embodying a program of instructions executable by the machine to perform method steps for automatically changing contents of keyboard display, the method steps comprising:

grouping one or more inputs into a first continuous segment representing a command phrase, said one or more inputs including a combination of voice input and keyboard input that are recognized and interpreted into the command phrase via a Hidden Markov model (HMM), the HMM comprising:

a first Hidden Markov model including one or more first states having one or more first arcs for connecting the one or more first states, the one or more first arcs representing output string of voice;

a second Hidden Markov model including one or more second states having one or more second arcs for connecting the one or more second states, the one or more second arcs representing output string of keys;

one or more third arcs connecting the one or more first states with the one or more second states, the one or more third arcs producing an empty output string, the one or more third arcs traversed when an interpretation state between the output string of the voice and the output string of keys are switched; and comparing the first continuous segment with a prestored key sequence-command pairs to determine an action which matches the command phrase designating contents to display, wherein the displayed contents represent user selectable functionality for performing functions associated with the command phrase.

22. The program storage device as claimed in claim 21, the method steps further including:

concatenating a second continuous segment accepted as input to the first continuous segment, if no match is found in the step of comparing.

23. The program storage device readable by machine as claimed in claim 21, wherein the voice input is a phoneme.

* * * * *

UNITED STATES PATENT AND TRADEMARK OFFICE
CERTIFICATE OF CORRECTION

PATENT NO. : 6,401,065 B1
DATED : June 4, 2002
INVENTOR(S) : Dimitri Kanevsky et al.

It is certified that error appears in the above-identified patent and that said Letters Patent is hereby corrected as shown below:

<u>Title page,</u>
Item [56], References Cited, "5,180,029" should read -- 5,181,029 --

Item [57], ABSTRACT,
Line 1, "use-friendly" should read -- user-friendly --

<u>Column 9,</u>
Line 31, "displacing" should read -- displaying --

<u>Column 10,</u>
Line 32, "he" should read -- the --

Signed and Sealed this

Nineteenth Day of November, 2002

*Attest:*

JAMES E. ROGAN
*Director of the United States Patent and Trademark Office*

*Attesting Officer*